United States Patent
Molnar

(10) Patent No.: US 11,386,123 B2
(45) Date of Patent: Jul. 12, 2022

(54) METHOD AND APPARATUS FOR FILE SYNCHRONIZATION BASED ON QUALIFYING TRIGGER ACTIONS IN INDUSTRIAL CONTROL APPLICATIONS

(71) Applicant: ABB Schweiz AG, Baden (CH)

(72) Inventor: Rick Molnar, Mentor, OH (US)

(73) Assignee: ABB Schweiz AG, Baden (CH)

( * ) Notice: Subject to any disclaimer, the term of this patent is extended or adjusted under 35 U.S.C. 154(b) by 323 days.

(21) Appl. No.: 15/377,056

(22) Filed: Dec. 13, 2016

(65) Prior Publication Data

US 2017/0169089 A1     Jun. 15, 2017

Related U.S. Application Data

(60) Provisional application No. 62/267,165, filed on Dec. 14, 2015.

(51) Int. Cl.
  *G06F 16/27*     (2019.01)
  *G06F 16/178*    (2019.01)
  *G05B 19/418*    (2006.01)

(52) U.S. Cl.
  CPC ....... *G06F 16/275* (2019.01); *G05B 19/4185* (2013.01); *G06F 16/178* (2019.01); *G05B 2219/31418* (2013.01); *G05B 2219/34376* (2013.01)

(58) Field of Classification Search
  CPC ............. G06F 16/275; G06F 17/30581; G06F 16/178; G05B 19/4185; G05B 2219/31418; G05B 2219/34376; Y02P 90/02
  See application file for complete search history.

(56) References Cited

U.S. PATENT DOCUMENTS

| | | | | |
|---|---|---|---|---|
| 6,330,568 | B1* | 12/2001 | Boothby | G06F 16/275 |
| 7,363,330 | B1* | 4/2008 | Ellman | G06F 16/182 |
| | | | | 707/620 |
| 7,849,257 | B1* | 12/2010 | Kim | G06F 3/0673 |
| | | | | 711/112 |
| 8,185,580 | B2 | 5/2012 | Sallberg | |
| 8,195,608 | B2 | 6/2012 | Arcese et al. | |
| 2005/0289350 | A1* | 12/2005 | Schmidt-Karaca | H04L 63/123 |
| | | | | 713/176 |
| 2006/0242206 | A1* | 10/2006 | Brezak | G06F 16/1787 |

(Continued)

*Primary Examiner* — Apu M Mofiz
*Assistant Examiner* — Farhad Agharahimi
(74) *Attorney, Agent, or Firm* — Leydig, Voit & Mayer, Ltd.

(57) ABSTRACT

Unique systems, methods, techniques and apparatuses of industrial control system file synchronization are disclosed herein. One exemplary embodiment is an industrial control system comprising an industrial controller and a first and second computing device. The second computing device includes a second non-transitory memory device structured to store both a file set and synchronization instructions, and includes a processing device configured to execute the synchronization instructions so as to classify a subset of files from the second file set by identifying files transferred to the second computing device from the industrial controller, classify a sub-subset of files from the subset of file using a set of synchronization rules, classify a set of synchronization files from the sub-subset of files, and transfer the set of synchronization files from the second computing device to the first computing device.

21 Claims, 2 Drawing Sheets

(56) References Cited

U.S. PATENT DOCUMENTS

| | | | |
|---|---|---|---|
| 2007/0088707 A1* | 4/2007 | Durgin | G06F 16/275 |
| 2010/0063670 A1* | 3/2010 | Brzezinski | H04N 21/4126 |
| | | | 701/31.4 |
| 2014/0337482 A1* | 11/2014 | Houston | H04L 67/06 |
| | | | 709/219 |
| 2015/0370827 A1* | 12/2015 | Parkison | G06F 11/2094 |
| | | | 707/626 |
| 2017/0169046 A1 | 6/2017 | Molnar | |

* cited by examiner

METHOD AND APPARATUS FOR FILE SYNCHRONIZATION BASED ON QUALIFYING TRIGGER ACTIONS IN INDUSTRIAL CONTROL APPLICATIONS

CROSS REFERENCE TO RELATED APPLICATION

This application claims priority under 35 U.S.C. 119(e) from U.S. provisional patent application no. 62/267,165 filed on Dec. 14, 2015, entitled "Method And Apparatus For File Synchronization Based On Qualifying Trigger Actions In Industrial Control Applications " which is hereby incorporated by reference in its entirety.

BACKGROUND

The present disclosure relates generally to file synchronization within an industrial control system. The goal of file synchronization in the prior art is to ensure devices in a system have access to the most up-to-date version of all important files. Existing industrial control systems suffer from a number of shortcomings and disadvantages. There remain unmet needs including increased synchronization efficiency, reduced memory size, and preventing unintended or undesirable synchronization. For instance, some synchronization methods are based on retaining and distributing the most up-to-date version of a file, using the chronology of a timestamp, within a system of devices or nodes. Some synchronization methods examine all of the potential files stored on different devices in the control system. The version of a file to be used as a source file to be synchronized is identified by the value of the time stamp of the file. Alternatively, if one device of the control system has a file and another device does not, that file will be copied to the device determined to not contain the file. Another common practice in the prior art is to perform the timestamp comparison processing on all potential files, which requires large amounts of data to be stored and processed. As the number of nodes in the industrial control system increase, the data storage and processing demands increase exponentially. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for an industrial control system. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
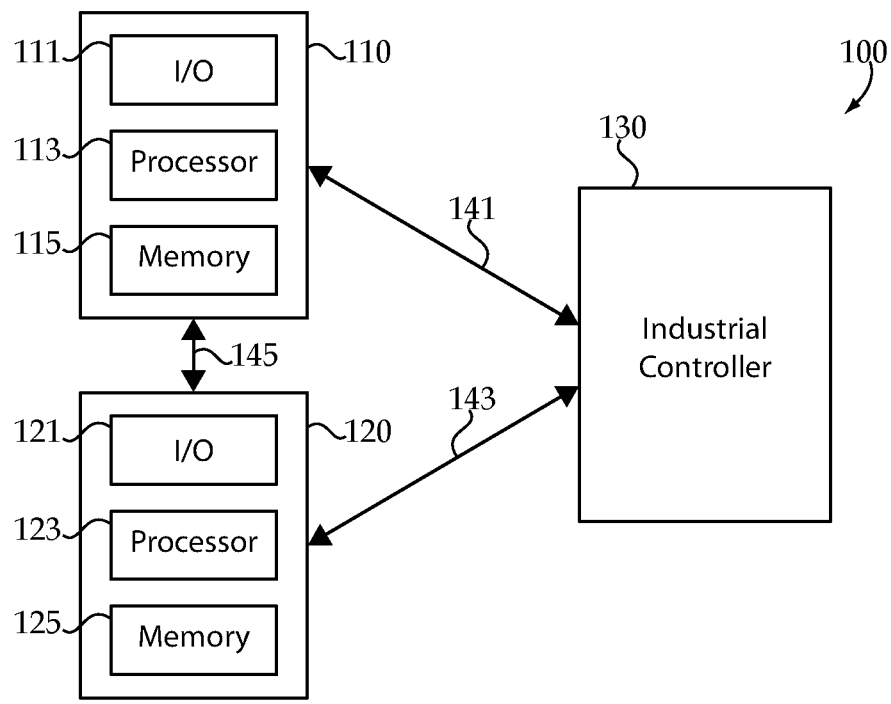
FIG. 1 illustrates an exemplary industrial control system.

With reference to FIG. 1 there is illustrated an exemplary industrial control system 100 including a plurality of computing devices 110 and 120, and an industrial controller 130. It shall be appreciated that industrial controller 130 may be implemented in a variety of scenarios, including a programmable logic controller (PLC), a supervisory control and data acquisition system (SCADA), or a distributed control system (DCS) to name but a few examples. In other embodiments, system 100 includes additional computing devices, each device having the features described herein with respect to computing devices 110 and 120.

Computing device 110 includes an input/output device 111 configured to communicate with other computing devices, such as computing device 120, by way of a communication channel 145. Input/output device 111 is also configured to communicate with industrial controller 130 by way of a communication channel 141. Input/output device 111 may communicate with controller 130 or computing device 120 by way of wired or wireless communication channel. For example, the input/output device 111 may be a network adapter, network card, interface, or a port (e.g., a USB port, serial port, parallel port, an analog port, a digital port, VGA, DVI, HDMI, FireWire, CAT 5, or any other type of port or interface). The input/output device 111 may be comprised of hardware, software, and/or firmware. It is contemplated that the input/output device 111 includes more than one of these adapters, cards, or ports.

Computing device 110 includes a processing device 113 and memory device 115. Processing device 113 is structured to communicate with input/output device 111 and memory device 115. Processing device 113 can be of a programmable type; a dedicated, hardwired state machine; or a combination of these. Device 113 can further include multiple processors, Arithmetic-Logic Units (ALUs), Central Processing Units (CPUs), Digital Signal Processors (DSPs) or the like. For forms of processing device 113 with multiple processing units, distributed, pipelined, and/or parallel processing can be used as appropriate. The processing device 113 may be dedicated to performance of just the operations described herein or may be used in one or more additional applications. In the depicted form, processing device 113 is of a programmable variety that executes algorithms and processes data in accordance with the synchronization instructions (such as software or firmware) stored in memory 115. Alternatively or additionally, the synchronization instructions for processing device 113 is at least partially defined by hardwired logic or other hardware. Processing device 113 can be comprised of one or more components of any type suitable to process the signals received from input/output device 111 or elsewhere, and provide desired output signals. Such components may include digital circuitry, analog circuitry, or a combination of both.

As described in more detail below, processing device 113 is configured to analyze computer files stored with memory 115 for the purposes of synchronize files within system 100. File synchronization is useful in industrial control applications with pre-existing files that can be used in different ways. In certain embodiments of system 100, the desired synchronization of files is not limited to determining whether the files exist or not, or determining whether the files are the most up-to-date. System 100 may be configured to expand and apply this file synchronization to local drives and remote network shares of other computer devices, also known as nodes.

The processes in the present application may be implemented with processing device 113 as operations by software, hardware, artificial intelligence, fuzzy logic, or any combination thereof, or at least partially performed by a user or operator. In certain embodiments, synchronization instructions represent software elements as a computer program encoded on a computer readable medium, wherein a controller or processing device performs the described operations when executing the computer program.

The memory 115 may be of one or more types, such as a solid-state variety, electromagnetic variety, optical variety, or a combination of these forms. Furthermore, the memory 115 can be volatile, nonvolatile, or a combination of these types, and some or all of memory 115 can be of a portable variety, such as a disk, tape, memory stick, cartridge, or the like. In addition, the memory 115 can store data that is manipulated by the synchronization instructions, such as data representative of signals received from and/or sent to the input/output device 111 in addition to or in lieu of storing synchronization instructions, just to name one example. As shown in FIG. 1, memory 115 may be coupled to the processing device 113 and/or included with the processing device 113. It shall be appreciated that any or all of the foregoing features of computing device 110 may also be present in the other computing devices disclosed herein.

Computing device 120 includes an input/output device 121, a processing device 123, and a memory device 125. Input/output device 121 is configured to communicate with computing device 110 by way of communication channel 145 and with industrial controller 130 by way of communication channel 143. Communication channel 143 may be a wired or wireless channel.

Figure 2:
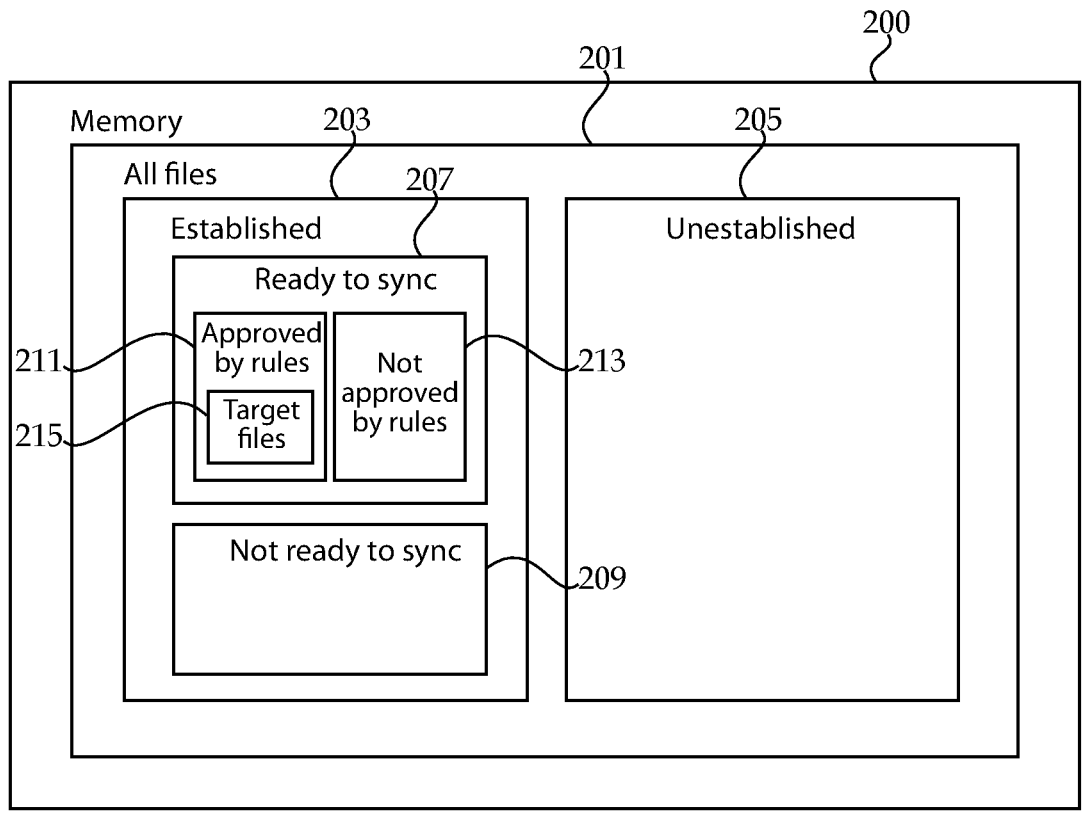
FIG. 2 is a block diagram illustrating the memory device of an exemplary industrial control system.

With reference to FIG. 2 there is a block diagram illustrating a memory device 200 such as memory device 115 or memory device 125 of system 100. Device 200 includes a set of computer files 201 stored with device 200. The set of computer files 201 are classified into subsets based on synchronization instructions executed by a processing device, such as processing device 113 or processing device 123. The synchronization process may include instructions stored on one of the computing devices 110 or 120.

The set of computer files 201 includes a set of established files 203 and a set of unestablished files 205. There may be many ways a file can be generated or processed in an industrial control application; however, only certain predetermined qualifying trigger actions performed on a file will establish the file. Trigger actions are events, which can be associated with a file to classify it as established. Only when certain predetermined qualifying trigger actions are performed on a file will the file be considered to have been established. A user may designate certain events as trigger. One example of a qualifying trigger action is uploading, or transferring, data to a computing device 110 from industrial controller 130. The data received is compiled into a file set including one or more files, which is then stored on a computing device. Forming the data into a file set may include combining, adding, omitting or altering the data. This stored file set is an established file set. Another example of a trigger action is a user intentionally identifies a specific file as established.

In certain embodiments, a trigger action is saving a change to a control drawing. In certain embodiments, a 'dedicated folder' location is identified as strictly for the archival and/or use of the most up-to-date or relevant control related files. An established trigger checking application may periodically check for a change in a file's timestamp by comparing stored previous versions to the most recent version, using hash values, such as a MD5 message digest algorithm, associated with the content of the files within this folder. In certain embodiments, the detection of a file's changed timestamp could be set up as being an established trigger. The trigger action may not be contingent upon the timestamp being newer. A change in timestamp may be a trigger action. For example, where a newer timestamped version exists, the new version may contain a mistake and the older file version is the one desired to be synchronized. If the older file is stored back in the dedicated folder and overwrites the newer timestamped file version, the file would be classified as established.

In certain embodiments, the above said established trigger checking application may use a content difference algorithm as a trigger action. For example, as indicated above a hash value associated with the content of the file could be used as a unique indicator for the contents of each file. Detecting a change in a file's hash value may be a trigger action.

The point in time when a file becomes an established file may be the time used for that computer device's latest established qualifying trigger timestamp. A file may be considered established immediately following the file upload from industrial controller 130 and respective file creation with computing device 110. Alternatively, following that point in time, a user may be asked whether to synchronize the established file, and point in time when the user responds could be the point in time to mark the latest established qualifying trigger timestamp.

The latest established qualifying trigger timestamp is the stored timestamp provided by each computing device when queried for which computing device has the latest or has performed a qualifying trigger action most recently. The latest established qualifying trigger timestamp may be updated each time a computing device performs a qualifying trigger action. The computing device with the most recent timestamp will serve as the file source for the other computing devices. For example, the file source computing device may provide files to computing devices which are initializing or reconnecting to system 100. When initializing a computing device, all computing devices are initialized with a default latest established qualifying trigger timestamp which indicates that there has never been a trigger action performed with the computing device. For example, a timestamp used for initializing a computing device may represent a time before the implementation of system 100 so as to indicate the computing device being initialized should not be identified as a source node. A list of established files 203 may be stored in a file on device 200.

When a computing device is initialized and brought on-line, an automatic routine is performed to identify and locate the computing device with the most recent or most up-to-date timestamp of the computing device's respective latest qualifying trigger action. The timestamp of a qualifying trigger action is stored on the respective computing device and is able to be queried by other computing devices.

Established files, which are ready to sync on the source computing device are then synchronized to the initializing computing device.

Unestablished files 205 are identified, but are not transferred to other computing devices, which saves storage space memory and, more importantly, reduces file synchronization processing. This file classification becomes even more effective given that the addition of computing devices to file synchronization processing would grow significantly if the entire set of computer files 201 were considered during synchronization. Classifying a file as unestablished may also prevent unintended or undesirable synchronization. In certain embodiments, a user may re-designate a file classified established as unestablished manually using a user interface. A user may also re-designate a file classified unestablished as established manually using the user interface.

The set of established files 203 includes a set of ready to synchronize files 207 and a set of not ready to synchronized files 209. The set of ready to synchronize files 207 may be viewable with a user interface displayed with computer device 110 or computing device 120. A user may identify which of the set of established file 203 should be included or excluded in the set of ready to synchronize file 207 using the user interface to classify a set of files ready to be synchronized 207. The remaining set of established files not ready to be synchronized 209 may be later reclassified to be included in the set of files ready to be synchronized.

The set of ready to synchronize files 207 includes a set of files approved by synchronization rules 211 and a set of files not approved by synchronization rules 213. Rules are examined to reduce the said established file set to file set 211. The set of files approved by synchronization rules 211 are determined by a set of governing rules. Some examples of these rules include, but are not limited to, the following: (i.) whether or not to permit file synchronization on the respective computing device; (ii.) whether to overwrite solely by comparing timestamps; (iii.) whether or not to overwrite/create files at a destination where the files are not established, but, incoming the source file is 'established'; (iv.) whether to allow established files to either sync within all predetermined groups of computing devices or to limit the sync to only within the local computing device's predetermined group (v.) whether to perform the synchronization immediately and automatically or to prompt the user for an input before performing the synchronization. Even if a qualifying trigger action occurs for a file, the file synchronization will not be performed on the file if the rule does not permit file synchronization. Only the files, which need to be synchronized, while taking the rules into account, will be synchronized, which reduces unnecessary transfer of data across the network.

In certain embodiments, the synchronization rules include a selection of eligible computing devices to receive target synchronization files. The computing devices selected by governing rules may be based on computing device type or selected by a user. The selected computing devices may be identified by IP address stored in memory on computing device 110 or 120.

In certain embodiments, Each computing device in system 100 have predetermined types associated with them according to their role in system 100. These types are detectable via a stored value on the computing device itself and is available via communication within the system 100. Each computing device is assigned a group number. For example one group may be identified as 51 and another as 99. Synchronization is prevented for ineligible computing device types and limited to synchronization only within predetermined identified groups.

The set of files approved by synchronization rules 211 includes a set of target synchronizable files 215. In certain embodiments, file characteristics for each established file are stored in memory device 115 of computing device 110. Characteristics of each file within the set of files approved by synchronization rules 211, including timestamps, may be compared to the characteristics of files stored with an intended recipient computing device. The characteristics of each file may include synchronize status, relative file path, file name, and file extension. The set of target synchronizable files 215 may not include files of file set 211 identified by the recipient computing device as files which do not need to be received in order to complete synchronization to other designated computing devices. When the set of synchronizable files 215 is transferred to an unsynchronized device, the characteristics of the transferred files may also be transferred.

The action of performing the file synchronization may be performed following the classification of the set of target synchronizable files 215 where a synchronization rule is set to automatically perform the synchronization after an upload operation from controller 130. In certain embodiments, the set of target synchronizable files 215 may not be synchronized until the next automated synchronization or when a user decides to initiate the synchronization operation.

In certain embodiments, a computing device, such as computing device 110, serving as a file source may transmit a request to synchronize the set of target synchronizable files 215 with another computing device, such as computing device 120. In response, computing device 120 may accept a portion of the set of target synchronizable files 215 using a set of governing rules, such as the governing rules described above with respect to file set 211. When the portion of the set of synchronizable files 215 is transferred to computing device 120, the characteristics of the transferred files may also be transferred computing device 120.

Figure 3:
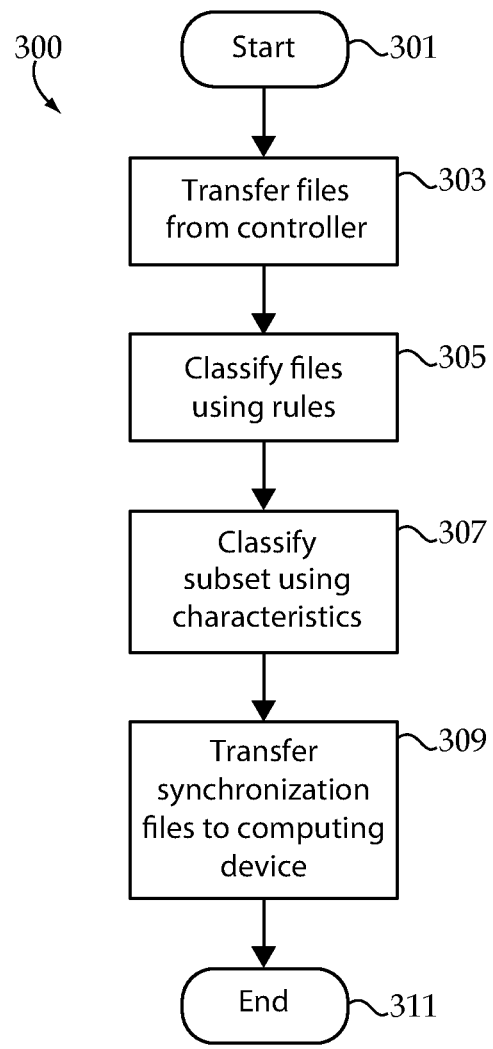
FIGS. 3 is a flowchart illustrating and exemplary synchronization process for an industrial control system.

With reference to FIG. 3, there is illustrated an exemplary process 300 for file synchronization in an industrial control system. Process 300 may be implemented in whole or in part in one or more of the control systems disclosed herein. In certain forms, the file synchronization functionalities may be performed by separate control systems. In certain forms, the file synchronization functionalities may be performed by the same control system.

Process 300 begins at start operation 301 and proceeds to operation 303 where a computing device, such as computing device 110 of system 100, receives data, such as a set of controller files, from an industrial controller. The set of controller files are designated as established files. A set of characteristics associated with the set of controller files are stored with memory device 115 and include a created or updated transfer timestamp indicating the time the set of controller files were transferred from the industrial controller representative of the latest established qualifying trigger action timestamp. Process 300 proceeds to operation 305 where the set of controller files is classified using a set of synchronization rules. A subset of files from the set of controller files is created which conform to the synchronization rules. Operation 305 may include a user selecting files ready to be synchronized. Process 300 proceeds to operation 307 where the subset of files from operation 305 are classified using characteristics of the files as well as characteristics of files from another computing device. For example, computing device 120, upon receiving a request to synchronize, may identify certain files from the subset of files from operation 305 which do not need to be synchronized by comparing the characteristics of the files stored on computing device 120 with the characteristics of files identified with operation 305. A set of synchronization files intended to be transferred to other computing devices, such as computing device 120 of system 100, is the product of the classification. Process 300 proceeds to operation 309 where the set of synchronization files are transferred to another computing device, such as computing device 120 of system 100, in order to synchronize the files stored with computing device 110 and computing device 120. Process 300 then proceeds to end operation 311.

It shall be further appreciated that a number of variations and modifications to process 300 are contemplated including, for example, the omission of one or more aspects of process 300, the addition of further conditionals and operations and/or the reorganization or separation of operations and conditionals into separate processes.

Further written description of a number of exemplary embodiments shall now be provided. One embodiment is an industrial control system comprising an industrial controller; a first computing device including a first non-transitory memory device configured to store a first file set, the first file set including a plurality of files each with an associated timestamp; and a second computing device structured to communicate with the industrial controller and the first computing device, the second computing device including a second non-transitory memory device structured to store both a second file set including a plurality of files and synchronization instructions; and a processing device configured to execute the synchronization instructions so as to: classify a subset of files from the second file set by identifying files transferred from the industrial controller to the second computing device, classify a sub-subset of files from the subset of files using a set of synchronization rules, classify a set of synchronization files from the sub-subset of files, and transfer the set of synchronization files from the second computing device to the first computing device.

In certain forms of the foregoing system, the processing device is configured to execute the synchronization instructions to determine a time associated with the transfer of the sub-subset of files. In certain forms, classifying the set of synchronization files includes identifying each file of the first file set which is a version of one of the files of the sub-subset of files and comparing the timestamp for each file of the first file set with the time associated with a corresponding file of the sub-subset of files. In certain forms, the time associated with the transfer of the subset of files is the time the transfer of the second file set to the second computing device from the industrial controller was completed. In certain forms, the set of synchronization rules include classifying a file as one of the sub-subset of files in response to determining a user has selected the file for synchronization. In certain forms, the set of synchronization files include files of the sub-subset of files for which there is no corresponding version within the first set of file stored with the memory device of the first computing device. In certain forms, the first computing device is configured to initialize by detecting the industrial controller, detecting the second computing device, detecting the subset of files, and receiving the subset of files from the second computing device. In certain forms, the first computing device includes a processing device configured to execute the synchronization instructions using the first file set.

Another exemplary embodiment is a method for synchronizing computer files of an industrial control system including a first computing device, a second computing device, and an industrial controller, comprising transferring, with the industrial controller, a set of controller files to the second computing device, the set of controller files corresponding to a transfer timestamp indicating a time the set of controller files were transferred to the second computing device; classifying, with the second computing device, a subset of files from the set of controller files using a set of synchronization rules; classifying, with the second computing device, a set of synchronization files from the subset of files using characteristics of files of the subset of files; and transferring the set of synchronization files from the second computing device to the first computing device.

In certain forms of the foregoing method, the method comprises connecting a third computing device to the second computing device. In certain forms, the methods comprises transferring, with the industrial controller, a second set of controller files to the first computing device, the second set of controller files corresponding to a second transfer timestamp indicating a second time the second set of controller files were transferred to the first computing device, determining the first transfer timestamp is more recent than the second transfer timestamp, and transferring the first set of controller files to the third computing device in response to determining the first transfer timestamp is more recent than the second transfer timestamp. In certain forms, the set of synchronization rules include classifying the first computing device as a synchronization target but not classifying the third computing device as a synchronization target. In certain forms, classifying the subset of files, classifying the set of synchronization files, and transferring the set of synchronization files occur automatically in response to transferring the set of controller files. In certain forms, the set of synchronization rules includes classifying a file as one of the subset of files in response to a user selecting a file for synchronization. In certain forms, the set of synchronization rules includes delaying the transferring until either a designated time or a user inputs a synchronization authorization.

A further exemplary embodiment is a method for synchronizing computer files of an industrial control system including a first computing device, a second computing device, and an industrial controller, comprising detecting, with the second computing device, a qualified trigger event; classifying a set of established files in response to detecting the qualified trigger event; classifying with the second computing device, a subset of files from the set of established files using a set of synchronization rules; classifying, with the second computing device, a set of synchronization files from the subset of files; and synchronizing the first computing device and the second computing device by transferring the set of synchronization files from the second computing device to the first computing device.

In certain forms of the foregoing method, the qualified trigger event is the transfer of data to the second computing device from the industrial controller and the creation of a file set using the transferred data. In certain forms, the set of synchronization files includes comparing a timestamp associated with the subset of files and a timestamp associated with a set of file stored in memory with the first computing device. In certain forms, the qualified trigger event includes moving a file to a designated folder. In certain forms, the qualified trigger event includes a user designating a file as an established file. In certain forms, the qualified trigger event includes modifying a file or detecting a change in the content of a file stored in memory with the second computing device.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred used in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. An industrial control system comprising:
   an industrial controller including a set of controller files including a timestamp indicating a latest established qualifying trigger action for the set of controller files;
   a first computing device including a first non-transitory memory device configured to store a first file set, the first file set including a plurality of files each with an associated timestamp; and
   a second computing device structured to communicate with the industrial controller and the first computing device, the second computing device including:
      a second non-transitory memory device structured to store a second file set including the set of controller files transferred from the industrial controller and synchronization instructions, wherein the second file set includes established files and unestablished files stored therein, the established files including ready for synchronization files and not ready for synchronization files, the ready for synchronization files including approved synchronization files that are approved by a set of synchronization rules and not approved files, and the approved synchronization files include target files for synchronization; and
      a processing device configured to execute the synchronization instructions so as to:
         classify a subset of files from the second file set as the established files by identifying files transferred from the industrial controller to the second computing device in response to the latest established qualifying trigger action,
         classify a subset of the established files as the that arc ready for synchronization in response to a user classification of the established files,
         classify the approved synchronization files from the ready for synchronization files based on characteristics of the ready for synchronization files using the set of synchronization rules, and
         transfer the target files from a portion of the approved synchronization files from the second computing device to the first computing device that are identified by the first computing device based on a set of governing rules used by the first computing device,
         wherein the target files include at least one file from the industrial controller for which the latest established qualifying trigger action is a change in the timestamp that indicates the at least one file from the industrial controller is an overwrite of a newer timestamped file version in the first file set, and the set of governing rules permit overwrite by comparing timestamps.

2. The system of claim 1 wherein the processing device is configured to execute the synchronization instructions to determine a time associated with the transfer of the target files.

3. The system of claim 2 wherein classifying the approved synchronization files includes identifying each file of the first file set which is a version of one of the files of the ready for synchronization files and comparing the timestamp for each file of the first file set with the time associated with a corresponding file of the ready for synchronization files.

4. The system of claim 2 wherein the time associated with the transfer of the target files is the time the transfer of the second file set to the second computing device from the industrial controller was completed.

5. The system of claim 2 wherein the user classification of the established files includes a user selection of established files for synchronization.

6. The system of claim 2 wherein the target files include files of the approved synchronization files for which there is no corresponding version within the first file set stored with the memory device of the first computing device.

7. The system of claim 1 wherein the first computing device is configured to initialize by detecting the industrial controller, detecting the second computing device, detecting the subset of files, and receiving the subset of files from the second computing device.

8. The system of claim 1 wherein the first computing device includes a processing device configured to execute the synchronization instructions using the first file set.

9. A method for synchronizing computer files of an industrial control system including a first computing device, a second computing device, and an industrial controller, comprising:
   transferring, from the industrial controller in response to a qualifying trigger action, a set of controller files to the second computing device, the set of transferred controller files including established files with a transfer timestamp indicating a time of a latest established qualifying trigger action and unestablished files;
   classifying, with the second computing device, a subset of files from the established files that are ready for synchronization in response to a user classification of the established file and a subset of files that are not ready for synchronizations;

classifying, with the second computing device, approved synchronization files and not approved synchronization files from the subset of files using a set of synchronization rules; and transferring target files to the first computing device from a portion of the set of approved synchronization files of the second computing device based on a set of governing rules used by the first computing device, wherein the portion of the approved synchronization files include at least one file from the industrial controller for which the latest established qualifying trigger action is a change in timestamp that indicates the at least one file from the industrial controller is an overwrite of a newer timestamped file version in the first computing device, and the set of governing rules permit overwrite by comparing timestamps.

10. The method of claim 9 comprising connecting a third computing device to the second computing device.

11. The method of claim 10 comprising transferring, with the industrial controller, a second set of controller files to the first computing device, the second set of controller files corresponding to a second transfer timestamp indicating a second time the second set of controller files were transferred to the first computing device, determining the first transfer timestamp is more recent than the second transfer timestamp, and transferring the first set of controller files to the third computing device in response to determining the first transfer timestamp is more recent than the second transfer timestamp.

12. The method of claim 10 wherein the set of synchronization rules include classifying the first computing device as a synchronization target but not classifying the third computing device as a synchronization target.

13. The method of claim 9 wherein classifying the approved synchronization files and transferring the target files occur automatically in response to transferring the set of controller files.

14. The method of claim 9 wherein the set of synchronization rules includes classifying a file as one of the subset of files in response to a user selecting a file for synchronization.

15. The method of claim 9 wherein the set of synchronization rules includes delaying the transferring until either a designated time or a user inputs a synchronization authorization.

16. A method for synchronizing computer files of an industrial control system including a first computing device, a second computing device, and an industrial controller, comprising:

detecting, with the second computing device, a qualified trigger event;

classifying, with the second computing device, a set of established files and a set of unestablished files from the industrial controller in response to detecting the qualified trigger event, wherein the set of established files include a timestamp indicating a time of a latest established qualifying trigger action;

classifying, with the second computing device, a subset of files from the set of established files that are ready for synchronization in response to a user classification of the set of established files and a subset of files that are not ready for synchronization;

classifying, with the second computing device, approved synchronization files and not approved synchronization files from the subset of files based on a set of synchronization rules; and synchronizing the first computing device and the second computing device by transferring target files to the first computing device identified by the first computing device from a portion of the approved synchronization files of the second computing device based on a set of governing rules used by the first computing device, wherein the target files include at least one file from the industrial controller for which the latest established qualifying trigger action is a change in timestamp that indicates the at least one file from the industrial controller is an overwrite of a newer timestamped file version in the first computing device, and the set of governing rules permit overwrite by comparing timestamps.

17. The method of claim 16 wherein the qualified trigger event is the transfer of data to the second computing device from the industrial controller and the creation of a file set using the transferred data.

18. The method of claim 16 wherein the set of governing rules includes comparing a timestamp associated with the approved synchronization files and a timestamp associated with a set of files stored in memory with the first computing device.

19. The method of claim 16 wherein the qualified trigger event includes moving a file to a designated folder.

20. The method of claim 16 wherein the qualified trigger event includes a user designating a file as an established file.

21. The method of claim 16 wherein the qualified trigger event includes modifying a file or detecting a change in the content of a file stored in memory with the second computing device.

* * * * *